(12) United States Patent
Morgan

(10) Patent No.: US 11,248,557 B1
(45) Date of Patent: Feb. 15, 2022

(54) PISTON HAVING OIL GALLERY DRAIN OUTLETS BIASED IN DISTRIBUTION TO ANTI-THRUST SIDE

(71) Applicant: Caterpillar Inc., Peoria, IL (US)

(72) Inventor: Bradley Morgan, Orion, MI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/110,470

(22) Filed: Dec. 3, 2020

(51) Int. Cl.
*F02F 3/22* (2006.01)
*F16J 1/16* (2006.01)
*F16J 1/08* (2006.01)

(52) U.S. Cl.
CPC .............. *F02F 3/22* (2013.01); *F16J 1/08* (2013.01); *F16J 1/16* (2013.01)

(58) Field of Classification Search
CPC ..... F02F 3/22; F02F 3/0015; F16J 1/16; F16J 1/08; F16J 1/14
See application file for complete search history.

(56) References Cited

U.S. PATENT DOCUMENTS

| | | | |
|---|---|---|---|
| 6,494,170 B2 | 12/2002 | Moloney et al. | |
| 6,513,477 B1 | 2/2003 | Gaiser et al. | |
| 8,065,985 B2 | 11/2011 | Schneider | |
| 8,136,502 B2 | 3/2012 | Gildemeister et al. | |
| 9,097,202 B2 | 8/2015 | He et al. | |
| 9,127,618 B2 * | 9/2015 | Azevedo | F02F 3/0069 |
| 9,228,530 B2 * | 1/2016 | Kodama | F16J 1/09 |
| 9,797,337 B2 * | 10/2017 | Nguyen | F16J 1/09 |
| 10,450,999 B2 | 10/2019 | Azevedo et al. | |
| 2003/0188633 A1 * | 10/2003 | Griffiths | F16J 1/005 |
| | | | 92/208 |
| 2009/0261232 A1 * | 10/2009 | Kollotzek | B22C 9/10 |
| | | | 249/175 |
| 2010/0275861 A1 * | 11/2010 | Schneider | F02F 3/003 |
| | | | 123/41.35 |
| 2011/0114054 A1 * | 5/2011 | Miller | F02F 3/00 |
| | | | 123/193.6 |
| 2016/0186686 A1 * | 6/2016 | Azevedo | F16C 7/023 |
| | | | 123/41.38 |

FOREIGN PATENT DOCUMENTS

| | | |
|---|---|---|
| CN | 105221290 A | 6/2018 |
| CN | 207686859 U | 8/2018 |
| CN | 106593676 B | 7/2019 |

* cited by examiner

*Primary Examiner* — Hung Q Nguyen
(74) *Attorney, Agent, or Firm* — Brannon Sowers & Cracraft PC

(57) ABSTRACT

A piston for an internal combustion engine includes a piston crown and a piston skirt, and an oil gallery formed between the piston crown and the piston skirt. A gallery inlet to the oil gallery, and a plurality of gallery drain outlets are formed in the piston skirt. The gallery drain outlets have, circumferentially around the piston center axis, a non-axisymmetric arrangement in a distribution biased to an anti-thrust side of the piston.

20 Claims, 3 Drawing Sheets

PISTON HAVING OIL GALLERY DRAIN OUTLETS BIASED IN DISTRIBUTION TO ANTI-THRUST SIDE

TECHNICAL FIELD

The present disclosure relates generally to a piston in an internal combustion engine, and more particularly to an arrangement of oil gallery drain outlets in a piston.

BACKGROUND

A great many different operating strategies and components designs are known in the field of internal combustion engines. Research and development has progressed for decades in relation to the manner in which factors such as fueling, exhaust gas recirculation or EGR, turbocharging, variable valve actuation, variable geometry turbines, use of waste gates, and a host of others can be varied to produce different results. In addition to varying these and other operating and design parameters, a great deal of research and performance testing effort has centered around different ways that engine components, notably pistons, can be shaped and proportioned to achieve various desired outcomes especially respecting emissions and efficiency.

Certain performance targets such as power density, capability for acceptance of load changes, cooling system size and efficacy, and still others can be in competition with the goals of emissions mitigation and fuel efficiency, for example. As a result, engine components, and again notably pistons, are often designed in view of a plethora of cross-coupled variables. It is not unusual for engine manufacturers to accept a performance penalty in one area in order to obtain a performance improvement in another area. Moreover, seemingly minor changes in component design or operating parameters suitably applied to one engine platform often have results that are difficult to anticipate when applied to another.

One area with continued motivation for advancements is the lubrication and cooling of pistons and related components given the typically harsh piston operating environment. Due to the rapid changes in pressure, relatively extreme temperatures and pressures, as well as the corrosive and fatigue-promoting environment, pistons, notably those used in compression-ignition diesel engines, are conventionally lubricated and cooled with a dedicated spray of oil to an underside of the piston. An example piston lubrication strategy is set forth in U.S. Pat. No. 6,494,170 to Moloney et al. In Moloney a duct from near the top of a skirt in a two-piece piston carries lubricant to a skirt pin bore, on each side of the skirt and lubricates the pin joint. Fluid sprayed against the crown descends onto the skirt and some passages such that direct, continuous lubrication of the pin joint is provided. While Moloney et al. may work suitably in its intended environment there is always room for improvement and alternative strategies.

SUMMARY OF THE INVENTION

In one aspect, a piston for an internal combustion engine includes a piston crown defining a piston center axis, and having a bowl surface forming a combustion bowl, a piston rim extending circumferentially around the combustion bowl, and a crown gallery surface opposite to the bowl surface. The piston also includes a piston skirt attached to the piston crown and having a skirt under-crown wall with a skirt bottom surface, and a skirt gallery surface opposite to the skirt bottom surface and facing the crown gallery surface. The piston skirt further includes a skirt axial wall extending circumferentially around the piston center axis and downwardly from the skirt under-crown wall and having a wrist pin bore formed therein and defining a bore center axis oriented normal to the piston center axis. An oil gallery is formed in part by each of the crown gallery surface and the skirt gallery surface and extends circumferentially around the piston center axis. A gallery inlet is formed in the piston skirt and opens to the oil gallery, and a plurality of gallery drain outlets are formed in the skirt under-crown wall and open in the skirt bottom surface at locations radially inward of the gallery inlet. The plurality of gallery drain outlets have, circumferentially around the piston center axis, a non-axisymmetric arrangement and a distribution biased to one side of the wrist pin bore.

In another aspect, a piston and pin joint assembly for an internal combustion engine includes a pin joint assembly having a connecting rod with a crank end, and a pin end having a rod head with a pin bore formed therein, and a wrist pin within the pin bore. The assembly further includes a piston defining a piston center axis and including a first wrist pin strut and a second wrist pin strut together forming a wrist pin bore defining a bore center axis and receiving the wrist pin such that the connecting rod is supported for pivoting around the bore center axis between a thrust side and an anti-thrust side of the piston. The piston further has formed therein an oil gallery, a gallery inlet, and a plurality of gallery drain outlets each extending between the oil gallery and an exposed bottom surface of the piston facing the pin joint assembly. The plurality of gallery drain outlets have, circumferentially around the piston center axis, a non-axisymmetric arrangement and a distribution biased to the anti-thrust side of the piston.

In still another aspect, a piston for an internal combustion engine includes a piston crown defining a piston center axis, and having a bowl surface forming a combustion bowl, a piston rim extending circumferentially around the combustion bowl, and a crown gallery surface opposite to the bowl surface. The piston further includes a piston skirt attached to the piston crown and including a skirt bottom surface, and a skirt gallery surface opposite to the skirt bottom surface and facing the crown gallery surface. An oil gallery is formed in part by each of the crown gallery surface and the skirt gallery surface. The piston skirt further has formed therein a wrist pin bore defining a bore center axis, and the bore center axis and the piston center axis lying in a common plane dividing the piston into a thrust side and an anti-thrust side. The piston skirt further has formed therein a gallery inlet to the oil gallery, and a plurality of gallery drain outlets from the oil gallery each opening in the skirt bottom surface to drain oil from the oil gallery toward a wrist pin supported in the wrist pin bore. The gallery inlet is located upon the thrust side of the piston, and the plurality of gallery drain outlets are biased in distribution to the anti-thrust side of the piston.

DETAILED DESCRIPTION

Figure 1:
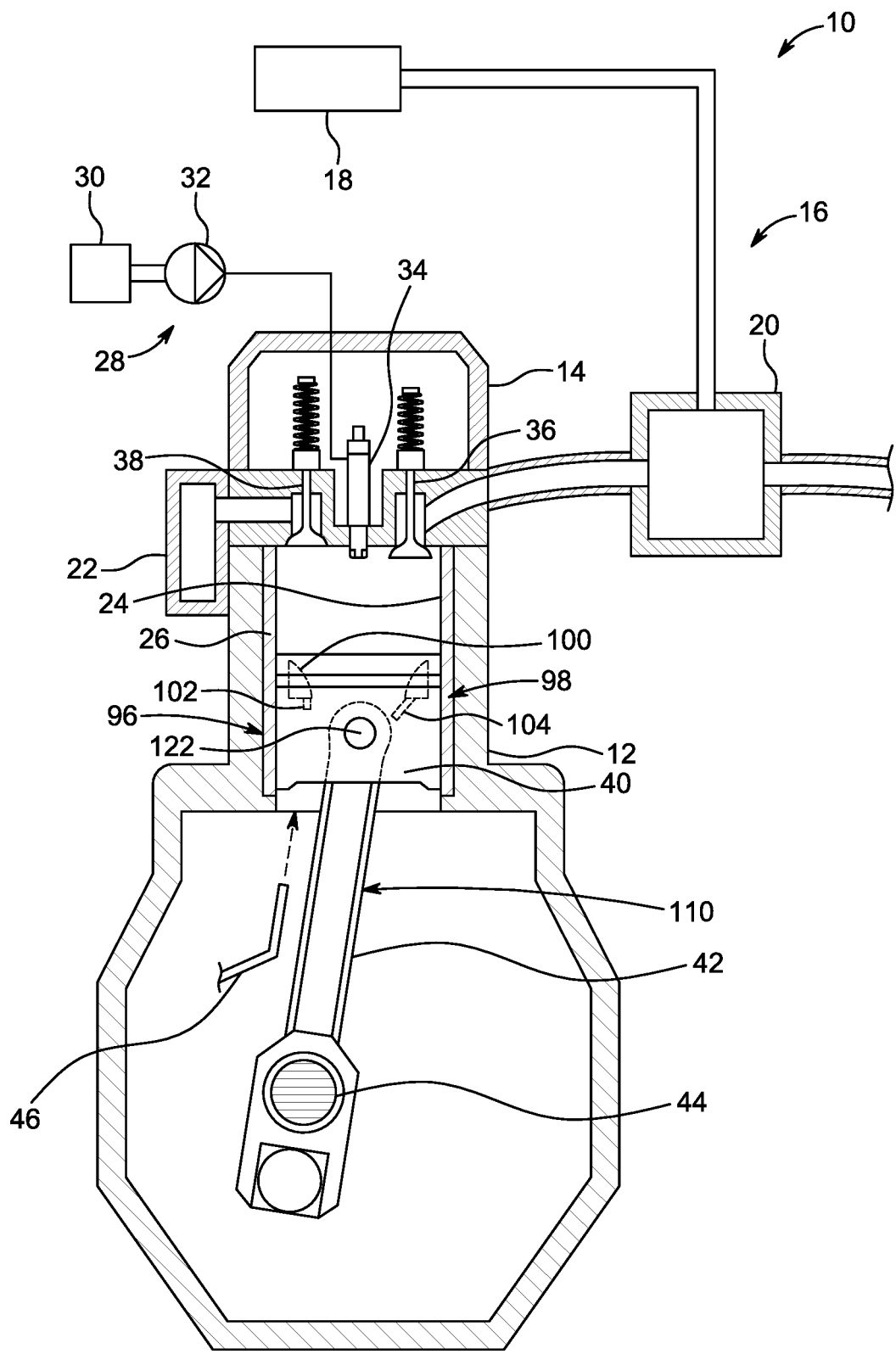
FIG. 1 is a sectioned side diagrammatic view of an internal combustion engine system, according to one embodiment.

Referring to FIG. 1, there is shown an internal combustion engine system 10 including an engine 11 having a cylinder block 12 and an engine head 14 attached to cylinder block 12. An intake system 16 is provided for conveying intake air from an air inlet 18 to an intake manifold 20, in turn conveying the intake air to a cylinder 24 formed in cylinder block 12. A turbocharger compressor could be positioned fluidly between air inlet 18 and intake manifold 20. Although only a single cylinder is shown, cylinder block 12 can include any number of cylinders in any suitable configuration, such as an inline configuration or a V-configuration. An exhaust manifold 22 conveys exhaust from cylinder 24 to an exhaust stack, tailpipe or the like, typically by way of an aftertreatment system (not shown). A cylinder liner 26 is within cylinder block 12 and forms cylinder 24 along with engine head 14. Internal combustion engine system 10 also includes a fuel system 28 including a fuel supply 30, such as a conventional fuel tank, and a fuel pressurization pump 32 structured to pressurize a fuel, such as a liquid fuel, for injection into cylinder 24 by way of a fuel injector 34. An intake valve 36 is shown positioned within engine head 14 and controls conveyance of intake air from intake system 16 into cylinder 24. An exhaust valve 38 is also positioned in engine head 14 and controls fluid connection between cylinder 24 and exhaust manifold 22.

Internal combustion engine system 10 can include a compression-ignition engine system structured to operate on a liquid fuel, such as a liquid diesel distillate fuel. In other instances, internal combustion engine system 10 could be spark-ignited or could operate on a mixture of a gaseous fuel and a liquid fuel, for example. Internal combustion engine system 10 is also illustrated with fuel injector 34 extending into cylinder 24 for direct injection. Alternatively, internal combustion engine system 10 could be port-injected, for example. Still other potential variations can include pressurization of liquid fuel to an injection pressure with a so-called unit pump of, or fluidly connected to, fuel injector 34, or provision of fuel from a pressurized common rail fluidly connected to multiple fuel injectors for multiple cylinders. Piston 24 is part of a piston and pin joint assembly 110 including a connecting rod 42 coupled to piston 24 by way of a wrist pin 122, and operable to rotate a crankshaft 44 as piston 24 moves between a top-dead-center position and a bottom-dead-center position in a conventional four-cycle pattern. An oil sprayer 46 is also provided to spray oil for lubrication and cooling toward an underside of piston 24 to lubricate and cool piston and pin joint assembly 110 in a manner further discussed herein.

Figure 2:
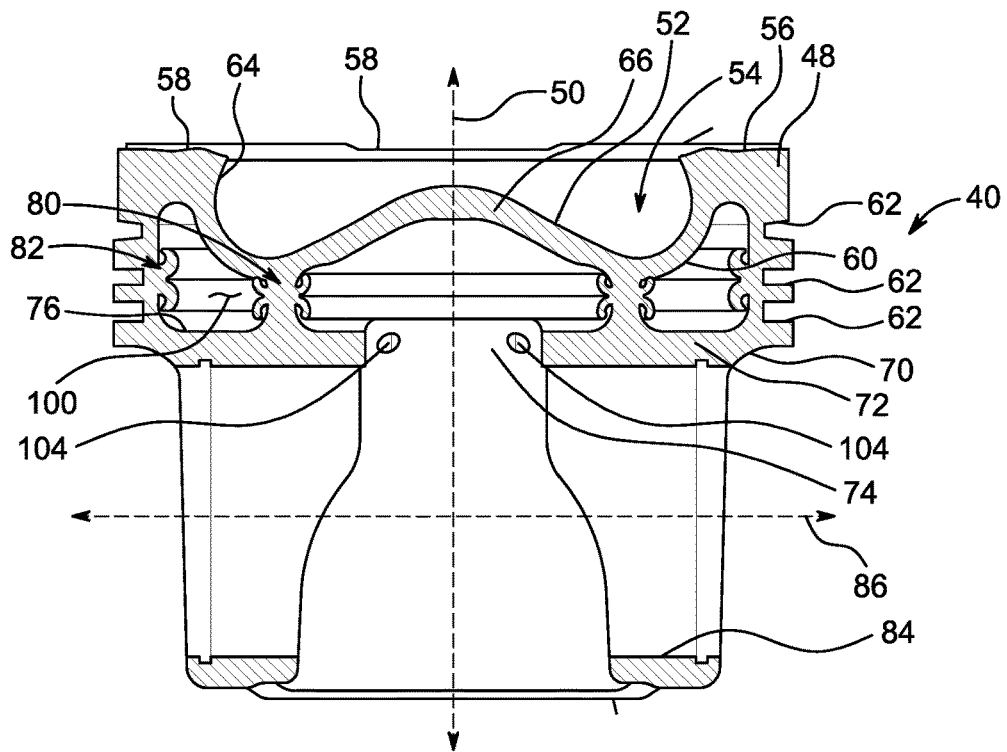
FIG. 2 is a sectioned side diagrammatic view of a piston, according to one embodiment.
Figure 3:
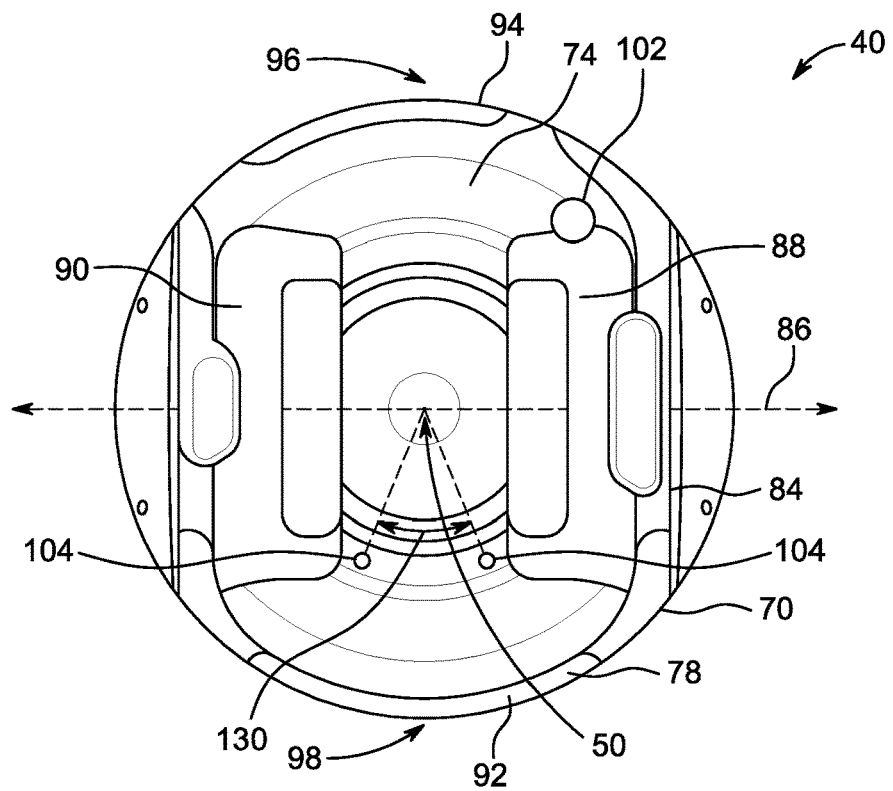
FIG. 3 is a bottom end view of the piston of FIG. 2.

Referring also now to FIGS. 2 and 3, piston 40 includes a piston crown 48 defining a piston center axis 50, and having a bowl surface 52 forming a combustion bowl 54, a piston rim 56 extending circumferentially around combustion bowl 54, and a crown gallery surface 60 opposite to bowl surface 52. The term "opposite" means that the respective surfaces are upon opposite sides of a common wall. In the illustrated embodiment, valve pockets 58 accommodating engine valves 36 and 38 in a generally known manner are formed in piston rim 56. Combustion bowl 54 may be a reentrant combustion bowl in some embodiments, having a combustion bowl edge 64 transitioning between bowl surface 52 and piston rim 56, and structured for promoting reentrancy of plumes of injected liquid fuel and combustion gases. A center cone 66 is formed by bowl surface 52 and is convex within combustion bowl 54 and generally centered on piston center axis 50.

Piston 40 also includes a piston skirt 70 attached to piston crown 48 and including a skirt under-crown wall 72 having a skirt bottom surface 74, and a skirt gallery surface 76 opposite to skirt bottom surface 74 and facing crown gallery surface 60. Piston skirt 70 further includes a skirt axial wall 78 extending circumferentially around piston center axis 50 and downwardly from skirt under-crown wall 72. Piston skirt 70 has a wrist pin bore 84 formed therein and defining a bore center axis 86 oriented normal to piston center axis 50. Piston crown 48 and piston skirt 70 may be joined by welding, such as by friction welding, and together form a radially inward circumferential weld joint 80 and a radially outward circumferential weld joint 82. Weld flash (not numbered) of weld joint 80 and 82 can be seen in FIG. 2. Piston skirt 70 further includes a first wrist pin strut 88 and a second wrist pin strut 90 which together each form a part of wrist pin bore 84.

An oil gallery 100 is formed in part by each of crown gallery surface 60 and skirt gallery surface 76 and extends circumferentially around piston center axis 50. A gallery inlet 102 is formed in piston skirt 70, and when piston 40 is installed for service in cylinder block 12 gallery inlet 102 may be positioned to receive an incoming stream of oil from oil sprayer 46. It can also be seen from FIG. 3 that skirt axial wall 78 includes a wall section 94 upon one side of wrist pin bore 84 and another wall section 92 upon an opposite side of wrist pin bore 84. Wall section 94 may be upon a thrust side 96 of piston 40, and wall section 92 may be upon an anti-thrust side 98 of piston 40. Wall section 92 has a relatively greater circumferential extent and wall section 94 has a relatively less circumferential extent, relative to piston center axis 50, at least at a terminal axial end of piston 40 visible in FIG. 3. The definitions and significance of thrust side 96 and anti-thrust side 98 and relationships of certain piston features to thrust side 96 and anti-thrust side 98 will be further apparent by way of the following description.

A plurality of gallery drain outlets 104 are formed in skirt under-crown wall 72 and open in skirt bottom surface 74 at opening locations radially inward of gallery inlet 102, and axially upward of wrist pin bore 84. It can be seen from FIG. 3 that gallery drain outlets 104 are relatively closer, radially, to piston center axis 50 than to gallery inlet 102. Gallery drain outlets 104 may have, circumferentially around piston center axis 50, a non-axisymmetric arrangement and a distribution biased to one side of wrist pin bore 84. Non-axisymmetric means that an arrangement of gallery drain outlets 104 are not radially symmetrically arranged around piston center axis 50. A distribution biased to one side of wrist pin bore means that a majority of, and potentially all of, gallery drain outlets 104 are upon one side of wrist pin bore 84, circumferentially around piston center axis 50.

In the illustrated embodiment, piston center axis 50 and bore center axis 86 lie in a common plane dividing piston 40 into thrust side 96 and anti-thrust side 98. Also in the illustrated embodiment, the distribution of gallery outlets 104 is confined to anti-thrust side 98 of piston 40, and gallery inlet 102 is in thrust side 94 of piston 40. It can further be noted that gallery outlets 104 are located angularly between first wrist pin strut 88 and second wrist pin strut 90, circumferentially around piston center axis 50. Gallery inlet 102 may form the only oil inlet to oil gallery 100. Gallery drain outlets 104 may form the only oil outlets from oil gallery 100. A number of gallery drain outlets 104 may be a total of two. As can also be seen from FIG. 3, an angle 130, circumferentially around piston center axis 50, may be defined by opening locations of gallery outlets 104 in the exposed bottom surface (skirt bottom surface 74) of piston skirt 70. The distribution of gallery drain outlets 104 may be confined to an angular range, circumferentially around piston center axis 50, that is 180° or less. In a refinement, the angular range may be 45° or less, such that angle 130 is 45° or less, and potentially approximately 30° as illustrated. In a related aspect, gallery inlet 102 and gallery drain outlets 104 are together within an angular range, circumferentially around piston center axis 50, that is 180° or less. As alluded to above, the relative placements of gallery inlet 102 and gallery drain outlets 104, circumferentially around piston center axis 50, can provide desired and optimized properties of performance.

Figure 4:
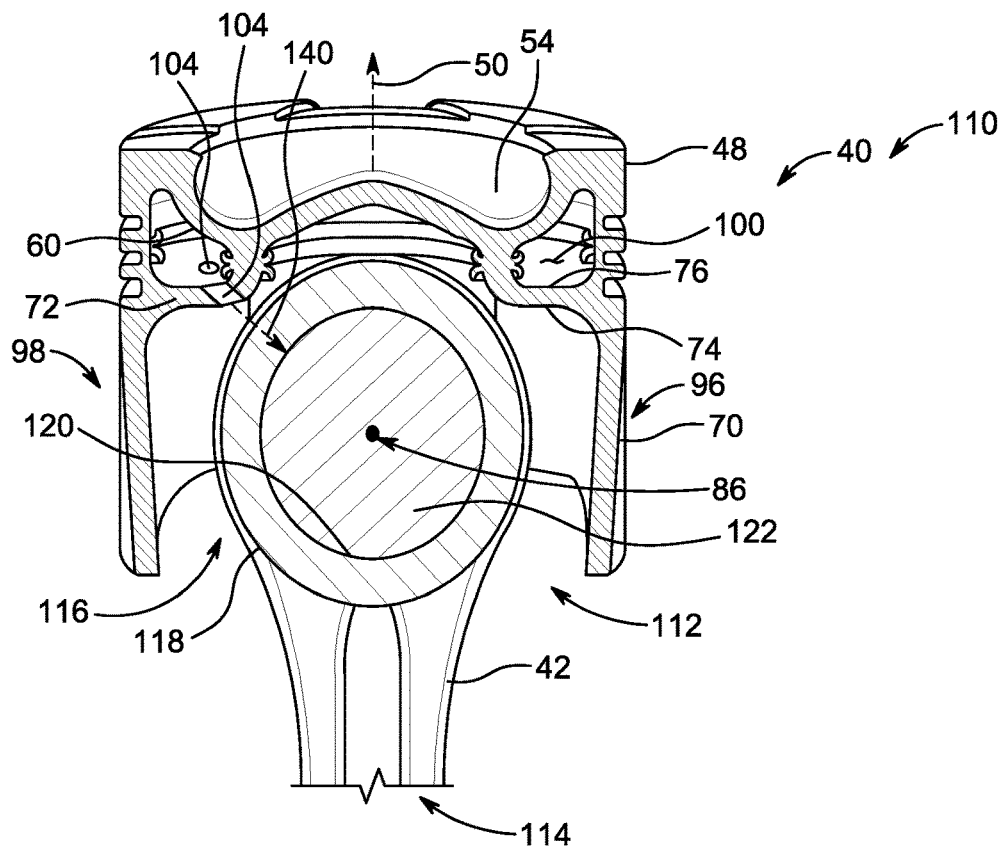
FIG. 4 is a sectioned side diagrammatic view of a piston and pin joint assembly, according to one embodiment.

Referring now also to FIG. 4, there is shown piston 40 assembled in a piston and pin joint assembly 110. Piston and pin joint assembly 110 includes piston 40 coupled with a pin joint assembly 112 including connecting rod 42 and a wrist pin 122. Piston and pin joint assembly 110 could also be packaged with a cylinder line in a so-called cylinder pack. Connecting rod 42 includes a crank end 114, and a pin end 116 having a rod head 118 with a pin bore 120 formed therein. Wrist pin 122 is within pin bore 120 and supported for rotation in first wrist pin strut 88 and second wrist pin strut 90 of piston 40. Wrist pin 122 is positioned in wrist pin bore 84 such that connecting rod 42 is supported for pivoting around bore center axis 86 between thrust side 96 and anti-thrust side 98 of piston 40. Gallery drain outlets 104 are shown extending through skirt under-crown wall 72, one of which is within the section plane of FIG. 4 and one behind. Each gallery drain outlet 104 defines a drain outlet axis 140 that extends radially inward and axially downward, relative to piston center axis 50, from oil gallery 100 to respective opening location in an exposed bottom surface of piston skirt 70, skirt bottom surface 74 as shown. As connecting rod 42 pivots between thrust side 96 and anti-thrust side 98, oil from oil gallery 100 will drain through gallery drain outlets 104 and contact rod head 118. Rod head 118 may have formed therein one or more holes to directly communicate the flow of drained oil to interfacing surfaces of rod head 118 and wrist pin 122. In some embodiments drained oil could impinge directly upon wrist pin 122.

INDUSTRIAL APPLICABILITY

Figure 5:
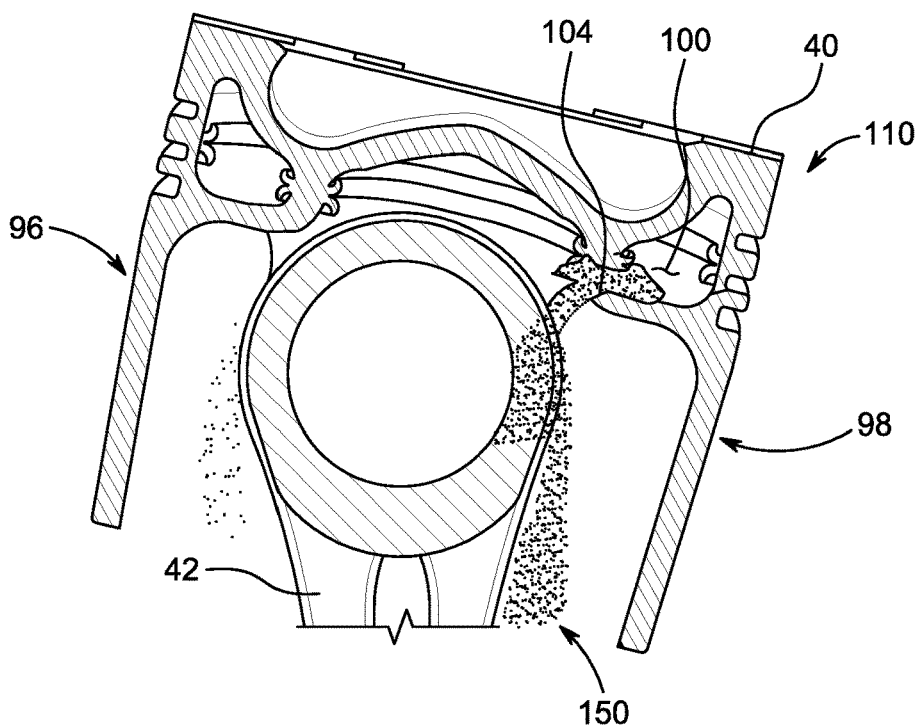
FIG. 5 is a sectioned side diagrammatic view of a piston and pin joint assembly illustrating example oil flow in service.

Referring to the drawings generally, but also now to FIG. 5, there is shown piston and pin joint assembly 110 where connecting rod 42 is pivoted toward anti-thrust side 98. Those skilled in the art will appreciate the dynamic conditions experienced by a piston and hardware coupled to the piston in an engine service environment during operation. It has been observed that certain wear or related phenomena may be most acute in a piston in response to side or thrust forces exerted during a power stroke according to well-known phenomena. In most pistons the thrust side and anti-thrust side are arbitrarily defined as the piston is axisymmetric. Pistons according to the present disclosure are non-axisymmetric and thus the thrust side and anti-thrust side are different, as described herein. As depicted in FIG. 5, piston and pin joint assembly 110 is shown as it might appear during an expansion stroke and being subjected to side or thrust forces, with connecting rod 42 pivoted toward anti-thrust side and exposed to a cascade of oil 150 draining through gallery drain outlets 104. By biasing a distribution of gallery drain outlets 104, and in some embodiments confining the distribution, to the anti-thrust side 98 drained oil for lubrication can be provided where it is expected to have the greatest benefit. In other words, the placement of gallery drain outlets 104 as described herein enables lubricating oil to be provided to surfaces most apt to need lubrication based upon the interactions amongst those surfaces at certain times in an engine cycle.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A piston for an internal combustion engine comprising:
   a piston crown defining a piston center axis, and having a bowl surface forming a combustion bowl, a piston rim extending circumferentially around the combustion bowl, and a crown gallery surface opposite to the bowl surface;
   a piston skirt attached to the piston crown and including a skirt under-crown wall having a skirt bottom surface, and a skirt gallery surface opposite to the skirt bottom surface and facing the crown gallery surface, and the piston skirt further including a skirt axial wall extending circumferentially around the piston center axis and downwardly from the skirt under-crown wall and having a wrist pin bore formed therein and defining a bore center axis oriented normal to the piston center axis;
   an oil gallery is formed in part by each of the crown gallery surface and the skirt gallery surface and extends circumferentially around the piston center axis;
   a gallery inlet is formed in the piston skirt and opens to the oil gallery;
   a plurality of gallery drain outlets are formed in the skirt under-crown wall and open in the skirt bottom surface at locations radially inward of the gallery inlet; and
   the plurality of gallery drain outlets have, circumferentially around the piston center axis, a non-axisymmetric arrangement and a distribution biased to one side of the wrist pin bore.

2. The piston of claim 1 wherein the distribution of the plurality of gallery drain outlets is confined to an angular range, circumferentially around the piston center axis, that is 180° or less.

3. The piston of claim 2 wherein the angular range is 45° or less.

4. The piston of claim 2 wherein:
   the piston center axis and the bore center axis lie in a common plane dividing the piston into a thrust side and an anti-thrust side; and
   the distribution of the plurality of gallery drain outlets is confined to the anti-thrust side of the piston.

5. The piston of claim 4 wherein the gallery inlet is in the thrust side of the piston.

6. The piston of claim 1 wherein the piston skirt further includes a first wrist pin strut and a second wrist pin strut, and the plurality of gallery drain outlets are located angularly between the first wrist pin strut and the second wrist pin strut, circumferentially around the piston center axis.

7. The piston of claim 6 wherein the gallery inlet forms the only oil inlet to the oil gallery, and the plurality of gallery drain outlets form the only oil outlets from the oil gallery.

8. The piston of claim 7 wherein a number of the plurality of gallery drain outlets is a total of two.

9. The piston of claim 1 wherein each of the plurality of gallery drain outlets extends radially inward and axially downward from the oil gallery to the respective opening locations, and each of the respective opening locations is axially upward of the wrist pin bore.

10. A piston and pin joint assembly for an internal combustion engine comprising:
 a pin joint assembly including a connecting rod having a crank end, and a pin end having a rod head with a pin bore formed therein, and a wrist pin within the pin bore;
 a piston defining a piston center axis and including a first wrist pin strut and a second wrist pin strut together forming a wrist pin bore defining a bore center axis and receiving the wrist pin such that the connecting rod is supported for pivoting around the bore center axis between a thrust side and an anti-thrust side of the piston;
 the piston further having formed therein an oil gallery, a gallery inlet, and a plurality of gallery drain outlets each extending between the oil gallery and an exposed bottom surface of the piston facing the pin joint assembly; and
 the plurality of gallery drain outlets have, circumferentially around the piston center axis, a non-axisymmetric arrangement and a distribution biased to the anti-thrust side of the piston.

11. The assembly of claim 10 wherein the distribution of the plurality of gallery drain outlets is confined to the anti-thrust side of the piston.

12. The assembly of claim 11 wherein the plurality of drain outlets is confined to an angular range circumferentially around the piston center axis that is 45° or less.

13. The assembly of claim 12 wherein the gallery inlet and the plurality of gallery drain outlets are together within an angular range, circumferentially around the piston center axis, that is 180° or less.

14. The assembly of claim 10 wherein a number of the plurality of gallery drain outlets is a total of two.

15. The assembly of claim 10 wherein each of the plurality of gallery drain outlets extends radially inward and axially downward from the oil gallery to opening locations in the exposed bottom surface.

16. The assembly of claim 15 wherein each of the opening locations is located radially inward of the gallery inlet.

17. A piston for an internal combustion engine comprising:
 a piston crown defining a piston center axis, and having a bowl surface forming a combustion bowl, a piston rim extending circumferentially around the combustion bowl, and a crown gallery surface opposite to the bowl surface;
 a piston skirt attached to the piston crown and including a skirt bottom surface, and a skirt gallery surface opposite to the skirt bottom surface and facing the crown gallery surface;
 an oil gallery is formed in part by each of the crown gallery surface and the skirt gallery surface;
 the piston skirt further having formed therein a wrist pin bore defining a bore center axis, and the bore center axis and the piston center axis lying in a common plane dividing the piston into a thrust side and an anti-thrust side;
 the piston skirt further having formed therein a gallery inlet to the oil gallery, and a plurality of gallery drain outlets from the oil gallery each opening in the skirt bottom surface to drain oil from the oil gallery toward a wrist pin supported in the wrist pin bore; and
 the gallery inlet is located upon the thrust side of the piston, and the plurality of gallery drain outlets are biased in distribution to the anti-thrust side of the piston.

18. The piston of claim 17 wherein:
 the gallery inlet and the plurality of drain outlets are together within an angular range, circumferentially around the piston center axis, that is 180° or less; and
 the gallery inlet forms the sole oil inlet to the oil gallery, and the plurality of gallery drain outlets form the only oil outlets from the oil gallery.

19. The piston of claim 17 wherein the piston skirt further includes a first wrist pin strut and a second wrist pin strut, and the plurality of gallery drain outlets are located angularly between the first wrist pin strut and the second wrist pin strut, circumferentially around the piston center axis.

20. The piston of claim 17 wherein the plurality of gallery drain outlets are confined in distribution to the anti-thrust side of the piston, and a number of the plurality of drain outlets is a total of two.

* * * * *